United States Patent
Zosi

[19]

[11] Patent Number: 6,079,919
[45] Date of Patent: Jun. 27, 2000

[54] TOOL SPINDLE CLAMPING DEVICE

[75] Inventor: Michel Zosi, Rennaz, Switzerland

[73] Assignee: C.R.I.D. S.A., Rennaz, Switzerland

[21] Appl. No.: 09/274,680

[22] Filed: Mar. 24, 1999

[30] Foreign Application Priority Data

Mar. 18, 1998 [CH] Switzerland ............................ 0652/98

[51] Int. Cl.$^7$ ................................ B23C 5/26; B23B 31/10
[52] U.S. Cl. ........................................ 409/233; 408/239 R
[58] Field of Search .................................... 409/231, 232, 409/233; 408/239 R, 239 A, 238

[56] References Cited

U.S. PATENT DOCUMENTS

| | | | |
|---|---|---|---|
| 3,490,333 | 1/1970 | Scruton | 409/233 |
| 3,633,457 | 1/1972 | Reeber et al. | 409/233 |
| 4,604,009 | 8/1986 | Tenneastedt | 409/233 |
| 4,764,064 | 8/1988 | Greinice | 409/233 |
| 4,836,723 | 6/1989 | Flammini | 409/233 X |
| 5,425,606 | 6/1995 | Kelch | 409/231 X |
| 5,662,442 | 9/1997 | Taki et al. | 409/239 R X |

*Primary Examiner*—William Briggs
*Attorney, Agent, or Firm*—Pearne & Gordon LLP

[57] ABSTRACT

For increasing the tensile force on the draw rod (4) of a tool spindle clamping device, in addition to a first, pretensioned spring assembly (8) between the draw rod (4) and sleeve (1) is a second spring assembly (15), which is coupled in pretension with a fastener (17, 18) between the proximal end of the sleeve (1) and the proximal end of the draw rod (4). In operation, the two spring assemblies (8, 15) act in parallel and lead to a tensile force of approximately 18,000 to 20,000 N with which the cone (7) of a tool (6) fixed to the draw rod (4) is drawn into an internal cone (2) of the sleeve (1). For ejecting the tool (6), the second spring assembly (15) is uncoupled from the draw rod (4) and the draw rod is moved against the distal end of the sleeve (1). For uncoupling the second spring assembly (15) from the draw rod, a hydraulically operated piston (20) is provided at the proximal end of the clamping device. In the piston (20) is a further, hydraulically operated piston (22) with which the fastener (17, 18) is opened and the draw rod (4) is displaced counter to the spring tension of the first spring assembly (8). The clamping device which, compared with known clamping devices, exerts a much higher tensile force on the tool, and is advantageously used for high speed, high precision machining operations.

12 Claims, 4 Drawing Sheets

TOOL SPINDLE CLAMPING DEVICE

FIELD OF THE INVENTION

The invention is in the field of machine tools and relates to a clamping device for a tool spindle.

BACKGROUND OF THE INVENTION

Clamping devices for tool spindles used in machine tools serve to clamp a tool. They normally comprise a tubular sleeve and a draw or tie rod axially movable to a limited extent in the sleeve. The sleeve has an internal cone, widening toward the distal end thereof, which is matched to a corresponding cone on the tools to be used with the spindle (e.g., standardized ISO or HSK interfaces). For attaching a tool to the spindle, the tool is coupled with the aid of a tool holder to the draw rod and the draw rod is drawn with a tensile force towards the proximal end of the sleeve. As a result, the tool cone is drawn into the internal cone of the sleeve and pressed therein. The frictional grip between the tool cone and the internal cone strengthens the spindle/tool unit and substantially absorbs torque acting on the tool during operation.

The sleeve is rotatably mounted in the spindle casing and, e.g., directly carries the rotor of an electric motor which drives the clamping device and a tool fixed thereto.

The drawing-in force necessary for the attachment of the tool in the clamping device is normally produced by a spring assembly or bank, which is positioned under pretension between the sleeve and draw rod. For removing the tool, the draw rod is moved counter to the spring tension of the spring assembly toward the distal sleeve end with a usually hydraulically operated piston acting on the proximal end of the draw rod. As a result, the tool cone is slid out of the internal cone of the sleeve and the connection between tool and draw rod is released, so that the tool can be removed.

As stated, the torque which can act during a working process on the tool of a machine tool is absorbed by the connection between clamping device and tool and is upwardly limited, and in a connection by cone/internal cone in particular, by the tensile force exerted on the draw rod. For higher power levels and higher speeds normally higher torques occur, so that in many cases it would be desirable to be able to increase the tensile force. As the tensile force also influences the static and dynamic stiffness of the unit constituted by the tool and the clamping device, and consequently also influences the attainable machining precision, it would also be desirable in this connection to be able to raise the tensile force.

The tensile force is primarily dependent on the spring characteristic (spring constant) of the spring assembly acting between sleeve and draw rod, which normally comprises a plurality of disk springs. It has been found that it is not easy to modify the spring characteristic of this spring assembly for significantly increasing the tensile force. This is due to the substantially predetermined geometrical conditions, because the external diameter of the sleeve is predetermined by the mounting and optionally by a motor, whose rotor it forms.

SUMMARY OF THE INVENTION

An object of the invention is to provide a clamping device for a tool spindle with overall dimensions substantially adapted to the overall dimensions of conventional tool spindles, the clamping device according to the invention typically having a standardized interface for a tool and is insertable in a spindle for a known machine tool, but the connection between the inventive clamping device and a tool fixed thereon is characterized by a much higher tensile force than is the case in known clamping devices.

In addition to a first spring assembly arranged under pretension, the use of which is known between sleeve and draw rod, the clamping device according to the invention has an additional, second spring assembly. This additional, second spring assembly is coupled under pretension between the proximal end of the draw rod and the proximal end of the sleeve for operational purposes and acts in parallel to the first spring assembly, but it supplies most of the tensile force. For releasing the tool, the second spring assembly is initially uncoupled from the draw rod, the tensile force thereby being reduced, and then in known manner by moving the draw rod towards the distal end of the sleeve, i.e. by compressing the first spring assembly, the tool is uncoupled from the draw rod.

A clamping device according to the invention with, e.g., an ISO-25 interface, e.g., has a tensile force of approximately 18,000 to 20,000 N (Newtons), compared with a tensile force of approximately 3,000 N for a known clamping device with the same interface.

BRIEF DESCRIPTION OF THE DRAWINGS

The tool spindle clamping device according to the invention is described in greater detail hereinafter with reference to the attached drawings, wherein.

DESCRIPTION OF PREFERRED EMBODIMENTS

Figure 1:
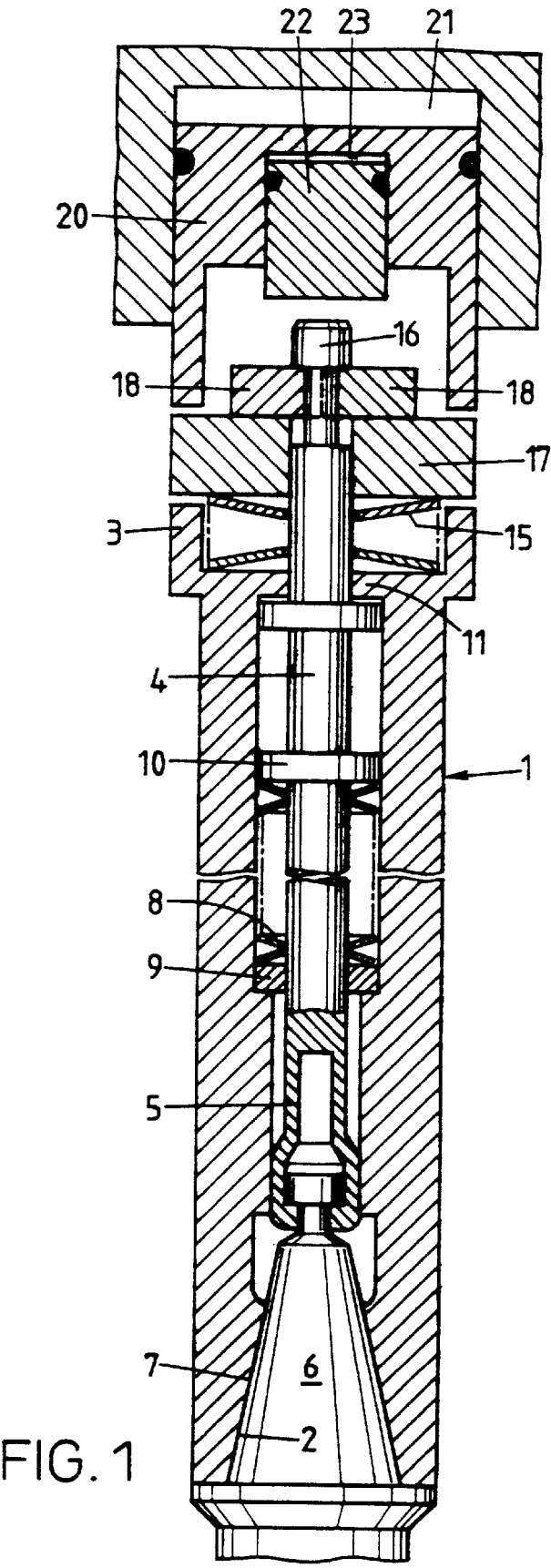
FIG. 1 is a schematic side elevation in axial section of an embodiment of a clamping device according to the invention.

FIG. 1 is an axial section through a schematically represented embodiment of the inventive clamping device for a tool spindle with a downwardly directed distal end and an upwardly directed proximal end. This clamping device has a sleeve 1 with an internal cone 2 at its distal end and a sleeve collar 3 at its proximal end. Sleeve 1 is mounted in a known manner, not shown, in a spindle casing and carries the rotor of an electric motor or is operatively connected thereto by means of a gear. The clamping device also has a tie or draw rod 4 which is coaxially located in sleeve 1 and carries at its distal end a tool holder 5.

Tool holder 5 and the internal surface of sleeve 1 are so matched to one another that tool holder 5, by an axial movement of draw rod 4 in the sleeve, can be brought into a clamped, i.e. radially compressed, position and into a released or an unclamped position. In the clamped position shown in FIG. 1, tool holder 5 engages by a positive or frictional grip around the proximal end of a tool 6 to be attached to draw rod 4. In the unlocked or released position, tool 6 can be inserted in or removed from tool holder 5.

Tool holder 5 is, e.g., a substantially hollow cylinder and has axial slits and, by an axial movement from a sleeve area with a larger internal diameter into a sleeve area with a smaller diameter, can be brought from its unclamped position into its clamped position.

Tool 6 has a cone 7, whose shape corresponds to internal cone 2 of sleeve 1. The conical shape is conventionally standardized (standardized ISO or HSK interface). Tool 6 coupled to draw rod 4 by tool holder 5 is drawn by a tensile force acting against the proximal end of the spindle into sleeve 1, or into internal cone 2 thereof.

Between sleeve 1 and draw rod 4 or between sleeve stop 9 and draw rod stop 10 is positioned a first spring bank or assembly 8. First spring assembly 8 is pretensioned by a limiter 11 located at the proximal end of sleeve 1. Internal cone 2 and limiter 11 are spaced apart in such a way that draw rod 4 is held in an axial position by a tool 6 coupled to draw rod 4 and in which first spring assembly 8 is somewhat more compressed than in its tool-free position defined by limiter 11.

First spring assembly 8 is designed and pretensioned for a tensile force which is at least able to clamp tool holder 5 and for a spring travel which at least corresponds to the axial travel (ejection travel) between the clamped and unclamped positions of tool holder 5. For the aforementioned clamping device (ISO-25 interface, ejection travel approximately 5 mm), use is, e.g., made of a first spring assembly 8, which comprises roughly twenty disk springs with a diameter of 20 mm and a spring constant of approximately 4,000 N/mm and which are pretensioned with approximately 1,000 to 2,000 N.

The second spring bank or assembly 15 is positioned on sleeve collar 3, which advantageously has a larger external diameter than sleeve 1. This second spring assembly 15 is pretensioned by a multi-part fastener 17, 18 between sleeve collar 3 and the proximal end of draw rod 4 which, e.g., has an enlarged head 16. Second spring assembly 15 has a much higher spring constant than the first spring assembly 8, i.e. it is compressible by a much higher tension around a much smaller spring travel.

For the aforementioned clamping device (IS0-25 interface) second spring assembly 15 comprises, e.g., three disk springs with a diameter of approximately 40 mm and a spring constant of approximately 120,000 N/mm, which are pretensioned with a tension of approximately 18,000 to 20,000 N (corresponding spring travel 3 to 6 mm).

For the insertion and ejection of a tool 6, i.e. for an axial movement of draw rod 4 against the distal end of sleeve 1, two actuating means are provided, e.g., a first hydraulically operated piston 20 in a cylinder 21 attached in the spindle casing for compression and consequently uncoupling of second spring assembly 15; and a second piston 22, which is hydraulically displaceable in a cylinder 23 located in first piston 20.

The advantage of this arrangement of two pistons 20 and 21 is that, for the compression of second spring assembly 15, a large surface is created, which makes it possible to apply the high force necessary for said compression with a relatively low hydraulic pressure (approximately 80 bar).

Figure 6:
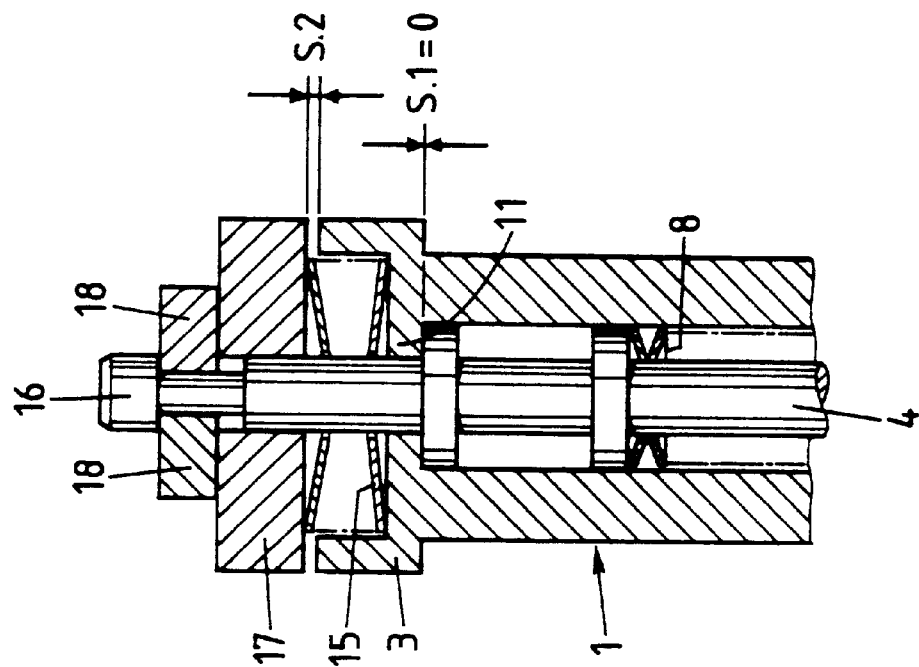

The function of the clamping device according to the invention will now be explained with reference to FIGS. 2 to 6. The parts of the clamping device have the same reference numerals as in FIG. 1. FIGS. 2 to 6 show, as axial sections, the proximal end of the clamping device in the operating state with a tool (not shown) at the distal end of draw rod 4 (FIG. 2), with the second spring assembly 15 uncoupled from draw rod 4 (FIG. 3), with a draw rod 4 released for ejecting the tool (FIG. 4), with the draw rod 4 in the ejection position (FIG. 5) and in an inoperative position with pretensioned spring assemblies 15 and 18, but without a tool (FIG. 6).

Figure 2:
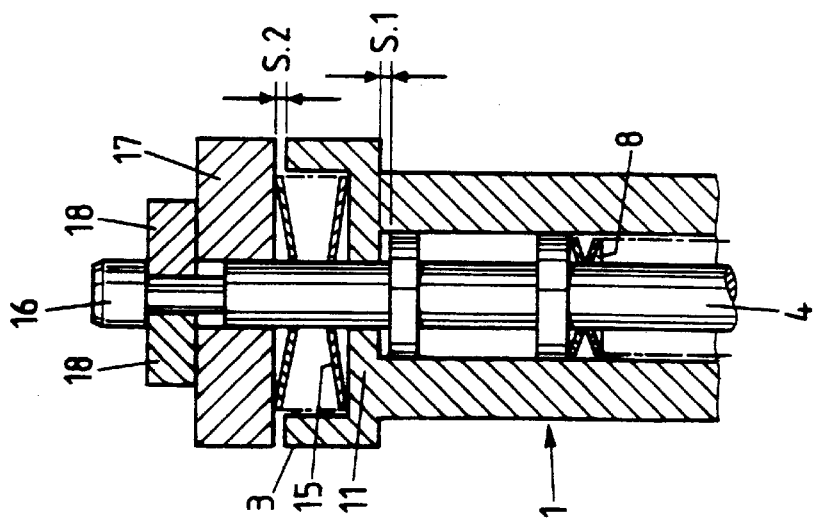

FIG. 2 essentially corresponds to FIG. 1. Draw rod 4 is held by the tool in a position in which first spring assembly 8 is pretensioned and draw rod 4 is spaced from proximal limiter 11 (clearance S.1). The fastener 17, 18 for coupling second spring assembly 15 to draw rod 4, and which, e.g., comprises a fastening ring 17 and two radially movable fastening elements 18 (for details see FIG. 7) is constructed in such a way that second spring assembly 15 is pretensioned in the desired manner and a certain clearance S.2 exists between sleeve collar 3 and the fastening ring.

The total tensile force acting on draw rod 4 and which consequently presses the not shown tool into the internal cone of the sleeve is the sum of the pretensions of first spring assembly 8 and second spring assembly 15.

Figure 3:
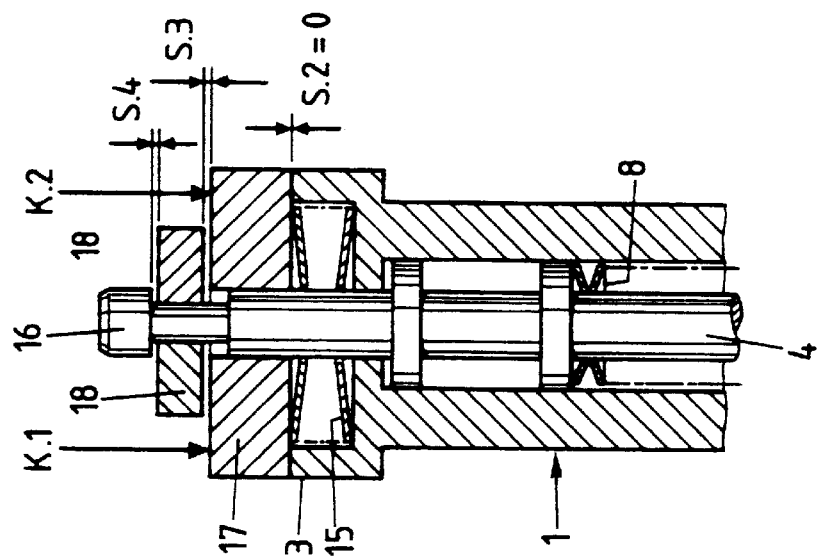

FIG. 3 shows the proximal end of the inventive clamping device at a stage where second spring assembly 15 is uncoupled from draw rod 4. This uncoupling is brought about by the first actuating means (piston 20, FIG. 1), which presses with force K.1 on fastening ring 17 and compresses spring assembly 15 by, at the most, the clearance S.2 between sleeve collar 3 and fastening ring 17. Through the action of force K.1 on the fastening ring, second spring assembly 15 is uncoupled from draw rod 4 and the fastening elements 18 are freed (clearance S.3 or S.4). Only a very small spring travel is necessary for this (clearance S.2), e.g., 0.4 mm.

Figure 4:
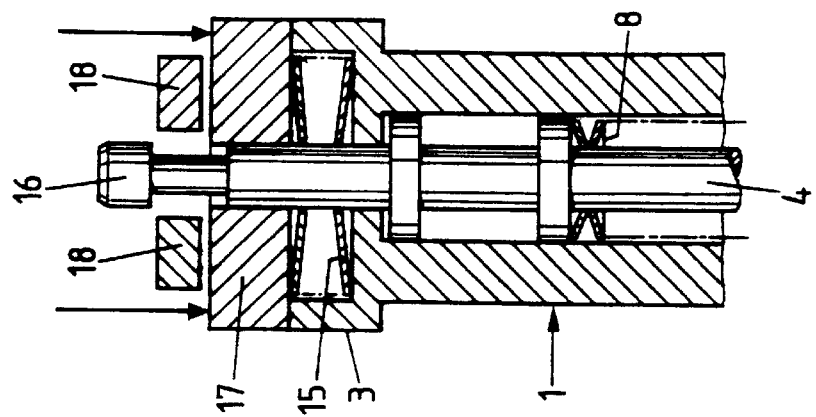
FIGS. 2 to 6 are partial side elevations, in section, of the proximal end of the clamping device according to FIG. 1 in different states for illustrating the operation of the inventive clamping device.

FIG. 4 shows the proximal end of the clamping device with the fastener open. Fastening elements 18 are radially moved apart, so that draw rod 4 for unclamping the not shown tool holder, i.e. for ejecting the tool, can be moved axially toward the distal end of sleeve 1. An actuating means is provided for the radial movement of fastening elements 18 and can, e.g., be the same as that with which the draw rod is axially moved (cf. FIG. 7).

Figure 5:
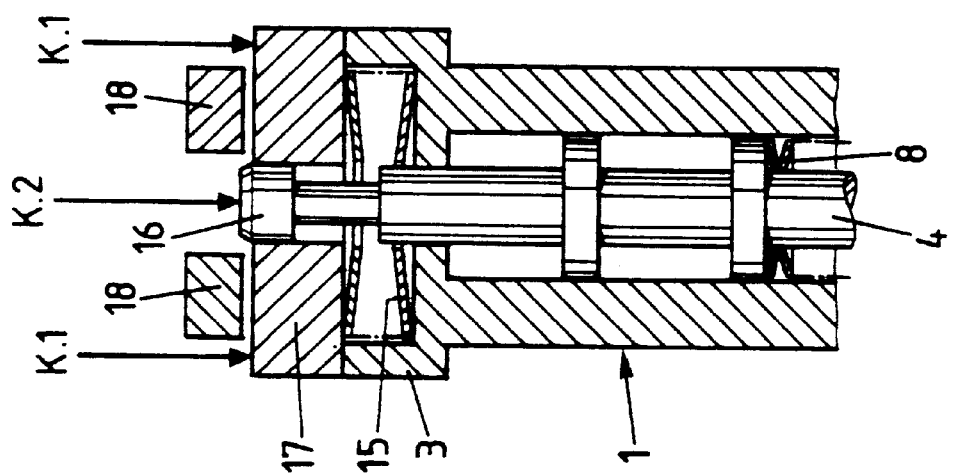

FIG. 5 shows the proximal end of the clamping device with the draw rod 4 in the ejection position. To bring the draw rod into this position and keep it there, a force K.2 is necessary, which acts on the proximal end of draw rod 4 and with which first spring assembly 8 can be correspondingly compressed. This force K.2 is brought about by a second actuating means, e.g., with the cylinder/piston unit 22, 23 (FIG. 1).

FIG. 6 shows the proximal end of the clamping device in an inoperative state, i.e. without tool and without any action of the actuating means. Thus, first spring assembly 8 is in a pretensioned state in which it presses the draw rod 4 against the proximal limiter 11 (clearance S.1=0) and second spring assembly 15 is also pretensioned by fastener 17, 18 between sleeve collar 3 and head 16 of draw rod 4.

For inserting a tool in the clamping device, which is in its inoperative state (FIG. 6), or for ejecting a tool from the clamping device (starting state in FIG. 2), the following steps are necessary:

- in addition to its pretensioning, compress the second spring assembly and uncouple it from the draw rod,
- open the fastener,
- in addition to its pretensioning, compress the first spring assembly and bring the draw rod into the ejection position,
- insert or remove the tool,
- relieve the first spring assembly, the draw rod being slid into its operating position and the first spring assembly assuming its pretensioned state,
- close the fastener,
- relieve the second spring assembly, it being coupled to the draw rod and assuming its pretensioned state.

Figure 7:
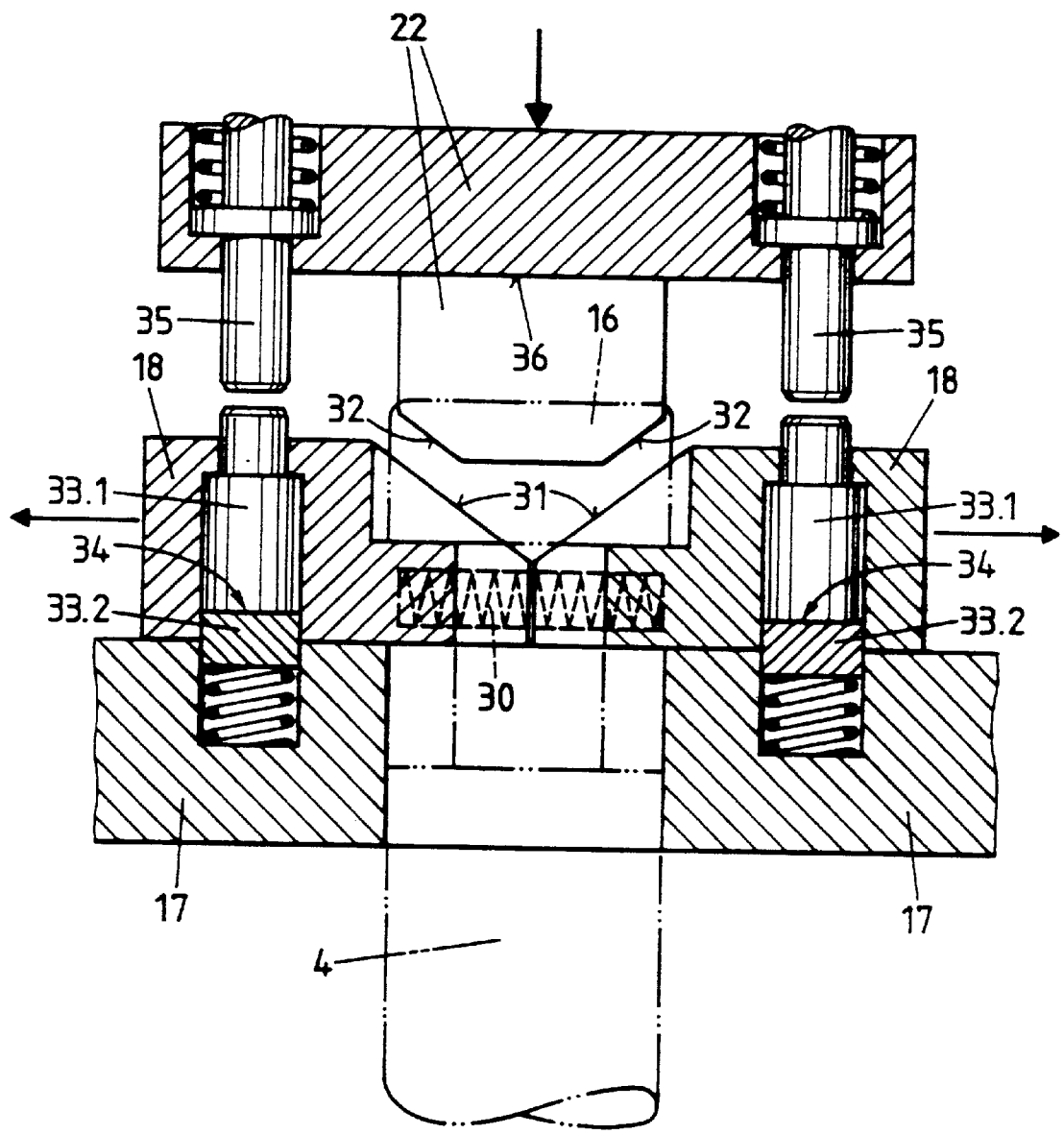
FIG. 7 is a side elevation, in partial section, of an embodiment of a detachable coupling and locking between the second spring assembly and draw rod.

FIG. 7 shows a preferred embodiment for a fastener for the clamping device according to the invention.

As shown in FIGS. 1 to 6, the fastener essentially comprises a fastening ring 17 and two axially movable fastening elements 18. There could be more than two fastening elements uniformly positioned around draw rod 4. Fastening elements 18 have a radial inner position (as shown in FIG. 7) in which they pass below head 16 of draw rod 4 (fastener closed) and a radial outer position in which they free head 16 (fastener open). The fastening elements are held by suitable means, e.g., by restoring springs 30, in the radial inner position and are driven back from the radial outer position into the inner position. Fastening elements 18 also have in each case two inwardly sloping control surfaces, which are positioned laterally of head 16 and which cooperate with corresponding control surfaces 32 on piston 22.

The fastening elements preferably also have locking means by which they can be locked in their inner position, so that they cannot be driven into their outer position by an operationally high centrifugal force and counter to the tension of restoring springs 30. The locking means 33 are, e.g., two-part locking pins 33.1, 33.2 spring-mounted in fastening ring 17. The plane of shear or separation 34 between locking pins 33.1 and 33.2 is displaced from the joint face between fastening rings 17 and fastening elements 18, when there is no external force on the pins, so that radial displacement of fastening elements 18 is blocked. Locking pins 33.1, 33.2 are operated by suitable control pins 35 on piston 22 which are so positioned on the piston that, if the piston is moved against the draw rod, they press on the locking pins 33.1, 33.2, so that their planes of shear are aligned with the joint face between fastening rings 17 and fastening elements 18, permitting radial movement of the fastening elements.

In place of individual, two-part locking pins 33.1, 33.2, it is also possible to use locking bodies (33.2) extending perpendicular to the paper plane of FIG. 7 which cooperate, e.g., with in each case two locking pins (33.1).

An end face 36 of piston 22 cooperates with the head of draw rod 4, control surfaces 32 for the radial movement of fastening elements 18 and control pins 35 for unlocking the fastening elements 18, and is so arranged on piston 22 that when piston 22 is moved toward the proximal end of sleeve 1, firstly fastening elements 18 are unlocked and then moved apart, and only then is draw rod 4 moved axially.

As a result of such an arrangement, the operation of the locking means 33, fastening elements 18 and draw rod 4 are interconnected in forced controlled manner.

What is claimed is:

1. A clamping device for tool spindles, comprising a sleeve (1) having a distal end with an internal cone (2) for receiving a cone (7) of a tool (6);

a draw rod (4) axially movable in said sleeve (1), said draw rod (4) having a distal end with a tool holder (5), movable by axial movement of said draw rod (4) in said sleeve 1 between clamped and unclamped positions;

a first, pretensioned spring assembly (8) between said sleeve (1) and said draw rod (4) for producing a tensile force on said draw rod (4) and driving said draw rod towards a proximal end of said sleeve (4) and moving said tool holder (5) into its clamped position;

actuating means (22, 23) at the proximal end of said clamping device for displacing said draw rod (4) toward said distal end of said sleeve (1) counter to spring force of said first spring assembly (8), a second spring assembly (15) for increasing tensile force on said draw rod (4), coupled in pretensioned manner between said proximal end of said sleeve (1) and said proximal end of said draw rod (4); and first actuating means (20, 21) for uncoupling said second spring assembly (15) from said draw rod (4).

2. A clamping device according to claim 1 wherein said second spring assembly (15) has a much higher spring constant than said first spring assembly (8).

3. A clamping device according to claim 2 including a fastener (18, 19) for selectively coupling said second spring assembly (15) to said proximal end of said draw rod (4), and second actuating means (22, 23) comprising means (32, 35) for opening said fastener prior to displacement of said draw rod (4).

4. A clamping device according to claim 3 wherein said first actuating means comprises a first piston (20) movable in a first cylinder (21) and a second piston (22) movable in a second cylinder (23), said second cylinder (23) of said actuating means being located in said first piston (20).

5. A clamping device according to claim 1 wherein said second spring assembly (15) is on a sleeve collar (3) at said proximal end of said sleeve (1) and wherein said sleeve collar (3) has a larger internal diameter than said sleeve (1).

6. A clamping device according to claim 5 wherein said second spring assembly (15) comprises a plurality of disk springs.

7. A clamping device according to claim 6 including a fastener for coupling said second spring assembly (15) to said draw rod (4) comprising a fastening ring (17) and a plurality of radially movable fastening elements (18) cooperating with a head (16) at said proximal end of said draw rod (4).

8. A clamping device according to claim 7 wherein displacement of radially movable fastening elements (18) from a radial inner into a radial outer position on said actuating means (22, 23) are provided control surfaces (32) and wherein restoring means is provided for restoring said fastening elements (18) to their radial inner position.

9. A clamping device according to claim 8 wherein said restoring means comprises restoring springs.

10. A clamping device according to claim 8 wherein said fastener has locking means for locking said radially movable fastening elements (18) in an inner radial position.

11. A clamping device according to claim 10 wherein said locking means comprises locking pins (33.1) and locking bodies (33.2) together forming a displaceable plane of shear (34).

12. A clamping device according to claim 11 wherein said actuating means includes control means (35) for controlling said locking means.

* * * * *